W. W. WALLACE.
COTTON-PRESS.
No. 170,610. Patented Nov. 30, 1875.
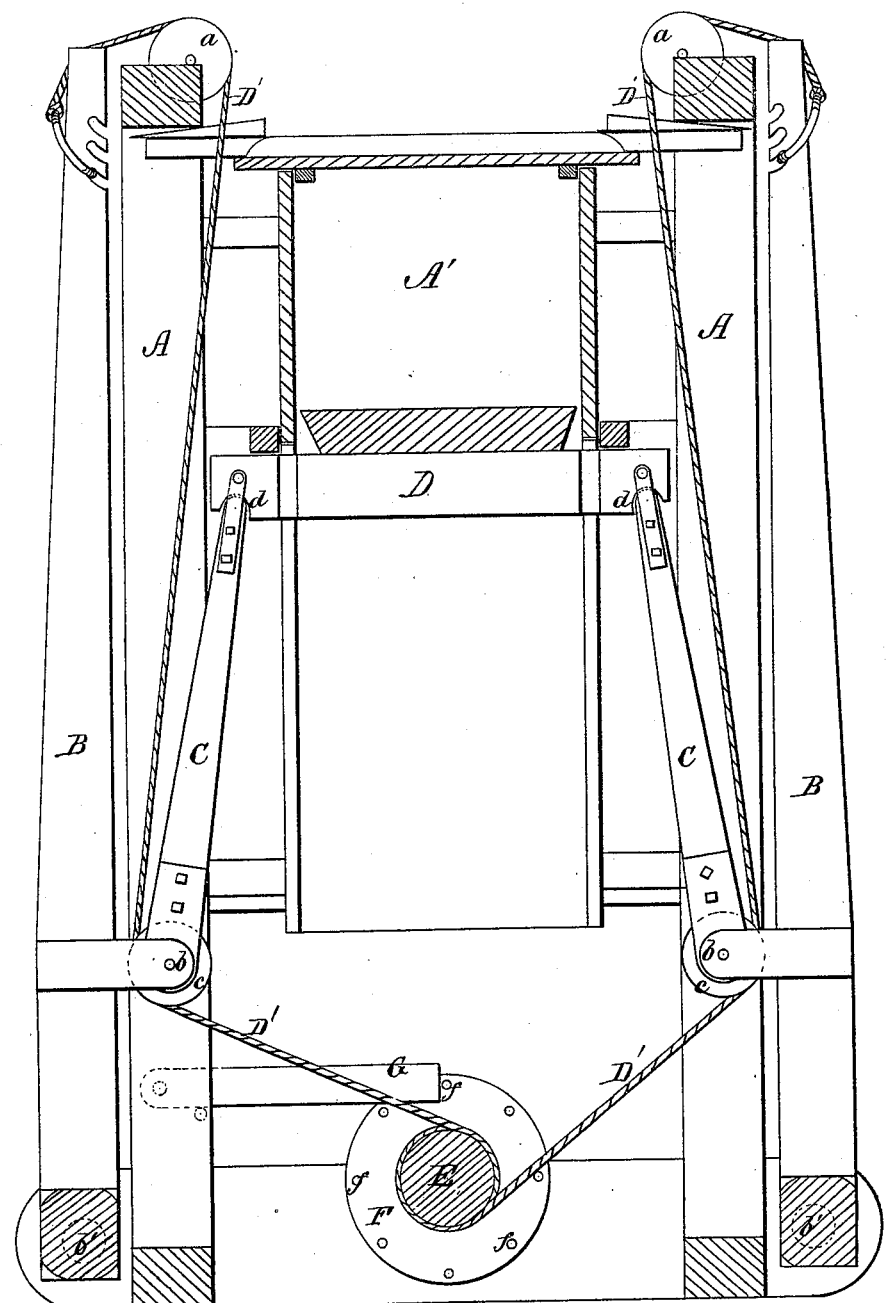

UNITED STATES PATENT OFFICE.

WESLEY W. WALLACE, OF NECHESVILLE, TEXAS.

IMPROVEMENT IN COTTON-PRESSES.

Specification forming part of Letters Patent No. 170,610, dated November 30, 1875; application filed November 3, 1875.

*To all whom it may concern:*

Be it known that I, WESLEY W. WALLACE, of Nechesville, in the county of Anderson and State of Texas, have invented a new and Improved Cotton-Press; and I do hereby declare that the following is a full, clear, and exact description of the same, reference being had to the accompanying drawing forming a part of this specification, in which the figure is a vertical section.

The invention relates to the mode of actuating the follower of a cotton-press, so as to give great convenience and facility, as well as compressing power, in operation.

The invention will first be described, and then pointed out in the claims.

A represents a frame, in which is secured the rigid part of press, while the press-box A' is made of detachable sections to admit of the easy insertion of the cotton from above, and the speedy re'ease of the compressed bale. B represents a lever on each side, rigidly attached to a pivoted post, b', while C is an arm, pivoted at b to the lever, and at d to the follower D. To the free end of each lever B is connected a cord or rope, D', that, on each side, passes over a frame-pulley, a, an arm-pulley, c, and thence about a median winding-drum, windlass, or shaft, E.

The arms C C being spread by the lateral movement of levers B B, the follower is drawn back, so that the cotton or hay may be conveniently inserted. The windlass being then turned by means of any suitable power applied to its wheel or pulley F, (that may be provided with a detent-pawl, G, to work against a rack or studs, f,) the cotton is condensed with great force in a brief time, and with comparatively little expenditure of labor.

Having thus described my invention, what I claim as new is—

1. The combination of levers B, arms C, and follower D, the arms being pivoted at one end to follower, and at b to the lever-arms, as and for the purpose described.

2. The combination of windlass E F, follower D, cords D', levers B, and arms C, the windlass being arranged under follower, and connected by the cords with the upper ends of levers, and the cords being carried over the upper frame-pulleys a and lower arm-pulleys c, as and for the purpose specified.

WESLEY W. WALLACE.

Witnesses:
T. S. RAYSDALE,
J. N. HARRIS.